United States Patent
Teichmann et al.

(10) Patent No.: US 9,777,787 B2
(45) Date of Patent: Oct. 3, 2017

(54) SPRING ASSEMBLY AND PROCESS OF PRODUCING A SPRING ASSEMBLY

(71) Applicant: Muhr und Bender KG, Attendorn (DE)

(72) Inventors: Gregor Teichmann, Siegen (DE); Boris Ditzer, Würdinghausen (DE); Hans-Ulrich Kriese, Weissensee (DE)

(73) Assignee: Muhr and Bender KG, Attendorn (DE)

( * ) Notice: Subject to any disclaimer, the term of this patent is extended or adjusted under 35 U.S.C. 154(b) by 0 days.

(21) Appl. No.: 15/143,837

(22) Filed: May 2, 2016

(65) Prior Publication Data

US 2016/0333956 A1 Nov. 17, 2016

(30) Foreign Application Priority Data

May 15, 2015 (DE) .................. 10 2015 208 978

(51) Int. Cl.
| | |
|---|---|
| *F16F 1/06* | (2006.01) |
| *F16F 1/12* | (2006.01) |
| *B60G 11/14* | (2006.01) |
| *B29C 65/48* | (2006.01) |
| *F16F 1/02* | (2006.01) |
| *B29L 31/00* | (2006.01) |

(52) U.S. Cl.
CPC ................ *F16F 1/12* (2013.01); *B29C 65/48* (2013.01); *B60G 11/14* (2013.01); *F16F 1/024* (2013.01); *F16F 1/06* (2013.01); *F16F 1/126* (2013.01); *B29L 2031/774* (2013.01); *B60G 2202/12* (2013.01); *B60G 2204/124* (2013.01); *B60G 2204/12422* (2013.01); *B60G 2206/42* (2013.01); *B60G 2206/821* (2013.01); *F16F 2226/02* (2013.01); *F16F 2226/042* (2013.01); *F16F 2230/0023* (2013.01)

(58) Field of Classification Search
CPC ......... B60G 15/062; B60G 11/14; F16F 1/02; F16F 1/06; F16F 1/12; B29C 65/48
USPC ......... 267/33–35, 64.11–64.19, 64.21–64.28, 267/166, 167–179, 220, 221; 188/321.11
See application file for complete search history.

(56) References Cited

U.S. PATENT DOCUMENTS

| | | | | |
|---|---|---|---|---|
| 4,595,445 A | * | 6/1986 | Hombach | C08G 18/4615 156/307.3 |
| 5,213,315 A | * | 5/1993 | Hartel | B60K 5/1283 267/140.11 |
| 5,421,565 A | * | 6/1995 | Harkrader | B60G 11/16 267/153 |
| 6,126,155 A | * | 10/2000 | Smith | B60G 15/067 267/220 |

(Continued)

FOREIGN PATENT DOCUMENTS

| | | |
|---|---|---|
| DE | 2063786 A1 | 7/1972 |
| DE | 102008025905 A1 | 12/2009 |

(Continued)

*Primary Examiner* — Christopher Schwartz

(74) *Attorney, Agent, or Firm* — Bejin Bieneman PLC

(57) ABSTRACT

A spring assembly comprises a spring with a coating, a spring retainer made of plastic material, an adhesive layer by which the spring and the spring retainer are bounded adhesively to one another, wherein the hardness of the adhesive layer is lower than the hardness of the coating. Further, a process of producing such a spring assembly is provided.

16 Claims, 3 Drawing Sheets

(56) References Cited

U.S. PATENT DOCUMENTS

| | | | |
|---|---|---|---|
| 2008/0224371 A1* | 9/2008 | Brand | B60G 15/063 267/221 |
| 2009/0212476 A1* | 8/2009 | Knebel, III | F16F 1/043 267/167 |
| 2010/0009086 A1* | 1/2010 | Tran | B05D 7/146 427/386 |
| 2010/0014792 A1* | 1/2010 | Kellam | B60G 15/067 384/196 |
| 2011/0140327 A1* | 6/2011 | Imaizumi | F01L 1/462 267/174 |
| 2014/0225319 A1* | 8/2014 | Schussler | B60G 11/14 267/179 |

FOREIGN PATENT DOCUMENTS

| | | |
|---|---|---|
| DE | 102011002065 A1 | 10/2012 |
| EP | 1165331 B1 | 9/2003 |
| JP | 2000304079 A | 10/2000 |
| JP | 2002130351 A | 5/2002 |
| WO | 2015146263 A1 | 10/2015 |

\* cited by examiner

SPRING ASSEMBLY AND PROCESS OF PRODUCING A SPRING ASSEMBLY

CROSS-REFERENCE TO RELATED APPLICATIONS

This application claims priority to German Application No. DE 10 2015 208 978.9 filed on May 15, 2015, which application is hereby incorporated herein by reference in its entirety.

BACKGROUND

From DE 10 2011 002 065 A1 a supporting assembly for a spring is known. The supporting assembly comprises an annular spring shim made of an elastic elastomer in which part of a spring winding of the spring is accommodated. Between the spring and the spring shim an adhesive is introduced, so that the connection between the spring shim and the spring constitutes a glued connection. The adhesive is hardened at room temperature.

EP 1 165 331 B1 proposes an assembly with a helical spring and a support for spring struts. Spring struts for motor vehicles comprise a shock absorber which, at its upper end, is connected to the vehicle chassis, and at its lower end to the wheel stub axle, as well as a helical spring. The lower end of the helical spring is connected to the shock absorber via a helical spring seat. The upper winding end of the helical spring is received by a supporting bearing.

The area of connection between the spring and the spring receiving means of a chassis is important from the point of view of safety. When in use, particles such as small stones may end up between the end winding of the axle spring and the axle spring support. Because of the relative movement between said components, the paint protecting the spring may be damaged, which in turn may lead to spring corrosion.

SUMMARY

Disclosed herein is a spring assembly which comprises a spring and a spring retainer, e.g., for a chassis of a motor vehicle, which assembly features a high degree of resistance against wear and thus has a long service life. Such spring assemblies usually comprise a spring retainer in which a coil end of the spring is received.

A spring supporting assembly comprises a spring with a coating, a spring retainer made of plastic material, an adhesive layer by which the spring and the spring retainer are adhesively connected to one another with the hardness of the adhesive layer being lower than the hardness of the coating of the spring.

An advantage is that, under load, the relatively soft adhesive layer is able to accommodate part of the energy introduced into the assembly by being elastically deformed. An advantageous strain gradient is achieved because of the adhesive between the spring coating and the resilient spring retainer forming a flexible layer. In particular, the load in the interface region between the spring retainer and the adhesive is lowered. Thus, relatively small distortions occur in said joint area between the adhesive layer and the spring retainer so that the degree of any load-related wear is relatively small. Furthermore, the adhesive layer being softer than the spring coating prevents the spring coating from being damaged under high loads.

In the present disclosure the term "hardness of the adhesive layer" in particular refers to the measurable hardness of the adhesive layer in the cured, i.e., hardened condition of the adhesive. For example, for measuring the hardness it is possible to use the indentation method. With this method, a penetrating body of a defined geometry, which is also referred to as an indenter, penetrates the material to be tested, with the material of the indenter being considerably harder than the sample itself. Independently of the geometry of the indenter, a respective force is associated with each penetration depth. The quotient of both factors, i.e., force and depth, constitutes a measure for the hardness and stiffness of the sample respectively. Known indentation methods for plastic materials are the Shore-A-method and the Shore-D-method for example. The hardness of metals can be determined according to Vickers and Brinell respectively, for example. In this case, an indenter generates plastic deformation which is measured by light microscopy and by which the hardness can be determined with the aid of the contact face, the associated force and depth of penetration.

The hardness of the adhesive layer preferably amounts to a maximum of 70 Shore-D, i.e., is preferably less than or equal to 70 Shore-D. Alternatively or in addition, the hardness of the adhesive layer can amount to a minimum value of 40 Shore-D, i.e., is more than or equal to 40-Shore-D. It is to be understood that any intermediate value between 40 Shore-D and 70 Shore-D is possible; for special applications it is optionally also possible that the hardness values may also be outside this range. In any case, the material of the adhesive layer is such that the hardness of the adhesive layer is lower than the hardness of the coating material of the spring. The spring coating preferably has a hardness of at least 70 Shore-D.

Furthermore, according to an example, the adhesive layer comprises a greater hardness than the spring retainer. Preferably, the hardness of the spring retainer amounts to at least 50 Shore-A. Alternatively or in addition, the spring retainer can comprise a maximum hardness of 80 Shore-A, wherein any intermediate value may be used and, optionally, even values greater than 80 Shore-A. The spring retainer can be made of a plastic material, more particularly of an elastomer or a plastic material comprising an elastomer, for instance caoutchouc. Also thermoplastics or duroplastics can be used as a material for the spring retainer.

Overall, it is advantageous that the hardness of the materials used decreases stepwise, starting from the spring which preferably consists of a hardenable spring steel, via the intermediate layers to the resilient receiving member. In this way, the energy introduced into the spring can be received gradually, with the elastic adhesive layer, through deformation, being able to receive part of the energy. Thus, overall, an advantageous strain gradient is achieved in the interface of said components. More particularly, the spring can comprise a greater hardness than the spring coating and/or the spring coating can comprise a greater hardness than the adhesive layer and/or the adhesive layer can have a greater hardness than the spring retainer.

According to a further example, it is proposed that also the stiffness can decrease starting from the spring, via the spring coating, further via the adhesive layer up to the spring retainer. More particularly, the spring can comprise a greater stiffness than the spring coating and/or the spring coating can comprise a greater stiffness than the adhesive layer and/or the adhesive layer can comprise a greater stiffness than the spring retainer.

Vice versa, the elasticity can increase starting from the spring, via the spring coating, further via the adhesive layer up to the spring retainer. More particularly, the spring retainer can comprise a greater elasticity than the adhesive layer and/or the adhesive layer can comprise a higher elasticity than the spring coating and/or the spring coating can have a greater elasticity than the spring.

Accordingly, the elongation at failure can increase from the spring, via the spring coating, further via the adhesive layer up to the spring receiving means. The elongation at failure characterises the deformation ability and ductility of a material. Elongation at failure describes the remaining change in length after fracture has taken place, with reference to the initially measured length of a sample in a tensile test; it may also be referred to as fracture elongation. More particularly, the spring retainer can comprise a higher elongation at failure than the adhesive layer and/or the adhesive layer can have a higher elongation at failure than the spring coating and/or the spring coating can have a higher elongation at failure than the spring. The adhesive layer preferably comprises a elongation at failure of at least 5%, more particularly at least 50%, preferably more particularly of at least 100%. An upper limit for the elongation at failure of the adhesive layer can be a maximum of 300% for instance.

According to an example, the adhesive layer can comprise a thickness of at least 0.1 mm, more particularly at least 0.5 mm. Alternatively or in addition, the adhesive layer can comprise a thickness of up to 3.0 mm, preferably a maximum of 1.5 mm, more particularly a maximum of 1.0 mm. To ensure a secure connection between the spring and the spring retainer with good damping characteristics it is particularly advantageous if the adhesive layer comprises a thickness of 0.5 to 0.7 mm. However, it is to be understood that also any other thickness value between 0.1 mm and 3.0 mm may be used. As a material for the adhesive layer a chemically hardenable adhesive based on a acryl derivative may be used for example.

To be able to produce a defined thickness of the adhesive layer, spacers can be provided which hold a surface of the coating and a surface of the spring retainer at a distance from one another, wherein the space formed between the surface of the coating and the surface of the spring retainer is at least largely filled with the adhesive. The term "at least largely" shall include in particular the possibility that the intermediate space formed between the spring and the spring retainer and filled with adhesive may also comprise production-related hollow spaces, respectively air inclusions. In one example, the intermediate space is largely filled with adhesive, more particularly up to at least 90%.

According to an example, the spacers can be distributed such that the spring and the spring retainer are aligned relative to one another in the axial direction and/or in the radial direction with reference to the spring axis. More particularly, a plurality of spacers can be arranged in the circumferential direction along the winding of the spring. Alternatively or in addition a plurality of spacers can be arranged offset relative to one another around a partial circumference of the spring wire in a cross-sectional view through the spring wire. Overall, this allows the spring to be aligned in the radial and axial direction relative to the spring retainer.

More particularly, the spacers can be provided in the form of elastic members which comprise a certain elastic resilience. In this way, one spring retainer can be used for springs with different wire diameters. In the case of a spring wire with a smaller diameter, a play fit or a slight pressure fit between the spacers and the spring can be provided, with the spacers holding the spring at a distance from the surface of the spring retainer. In the case of a spring wire with a greater wire diameter, a pressure fit may be provided between the spacers and the spring, with in this case, too, the spring surface being held at a distance from the surface of the retainer by spacers.

According to a possible example, the spacers can be provided in the form of projections which project from the surface of the spring retainer. The projections are preferably produced so as to be integral with the retainer, i.e., integrally formed to same. To ensure good supporting and force introducing conditions it is advantageous if, in a cylindrical section through the spring retainer, at least three spacers, in one example at least eight spacers, are circumferentially distributed at the spring retainer. Alternatively or in addition, in a radial section through the spring retainer, at least three, in one example at least four, spacers can be distributed along the trough for receiving the spring.

The spring retainer is preferably designed such that, if viewed in a radial section through the spring retainer, i.e., in a cross-sectional view through the spring wire, the spring is received in the spring retainer and is connected by the adhesive layer to the spring retainer over a wrap angle range of at least 30°, preferably at least 100° and/or a maximum of 150°. In this way, the loads acting between the spring and the spring retainer are distributed as evenly as possible, with good support conditions being achieved. More particularly it is proposed that the adhesive layer in said wrap angle range around the spring wire and/or in the wrap angle range along the spring winding, around the spring axis, comprises a substantially constant thickness. In this connection, "a substantially constant thickness" shall include certain production-related tolerances of the adhesive layer thickness of ±10%.

The spring can be provided in the form of a helical spring which comprises a helically wound wire. An end portion of the helical spring is received in the spring retainer, which end portion, in an axial view, can extend by, for example, 180° to 360° around the spring axis. The contour of the spring retainer is preferably adapted to the cross-sectional shape of the spring, so that these are securely connected to one another. Preferably, this also applies to every type of spring used, i.e., springs other than helical springs. The helical spring can be cylindrical or conical, for example. The centre line of the helical spring, which can be defined as the sum of all centres of an envelope of the helical spring, can be curved in one or several dimensions, e.g., it can be C-shaped and/or S-shaped. Furthermore, the helical spring can comprise a variable wire diameter, a variable gradient and/or a variable spring diameter which varies along the length of the spring. It is to be understood that, in principle, the spring assembly can also comprise any other type of spring. More particularly, the spring assembly can comprise any kind of coated spring for which technical advantages can be expected for an adhesive layer consisting of a resilient material and arranged between the coated spring and the resilient spring retainer. For example, the spring of the spring assembly can be provided in the form of a leaf spring, a U-shaped spring, an undulating spring, or a plate spring.

Further disclosed is a process of producing a spring assembly with a spring and a spring retainer which can comprise one or several of the above-mentioned examples, with the process comprising the following process steps: providing a spring retainer made of plastic material with a first hardness; providing an adhesive with a second hardness which is greater than the first hardness of the spring retainer; providing a spring with a coating with a third hardness which is greater than the second hardness of the adhesive; applying the adhesive to the spring retainer; positioning the spring on the spring retainer, that is provided with the adhesive, such that a surface of the coating and a surface of the spring retainer are held so as to be spaced from one another.

Said process achieves the same advantages as the above-mentioned assembly, so that to avoid repetition reference is made to the above description. It is to be understood that all the product-related features apply to said process and that, vice versa, all process-related features also apply to said product.

For the spring retainer, more particularly, an elastomer-containing plastic material may be used, with a hardness of a minimum of 50 Shore-A and/or a maximum of 80 Shore-A. Alternatively or in addition, an adhesive comprising a hardness of a minimum of 40 Shore-D and/or a maximum of 70 Shore-D can be used. Alternatively or in addition, the coating can have a hardness of a minimum of 70 Shore-D.

According to a preferred process example, the spring, after the adhesive has been applied to the spring retainer, is held in a substantially pressure-less way on the spring retainer. The expression "substantially pressure-less" shall include in particular that the spring may be pressed against the spring retainer because of the deadweight of the spring and optionally the deadweight of an aligning element by which the spring may be aligned relative to the spring retainer for the period during which the adhesive hardens. More particularly, the hardening of the adhesive can take place at room temperature.

A spring assembly with a helical spring as disclosed herein can be used in particular for a chassis of a motor vehicle. In this intended use the helical springs are also referred to as axle springs or chassis springs. In this case, the spring retainer which can also be referred to as spring support or spring receiving means are supported against a spring plate of the chassis or the body of the motor vehicle, respectively.

SUMMARY OF THE DRAWINGS

Further details will be described below with reference to the Figures, wherein.

DETAILED DESCRIPTION

Figure 1:
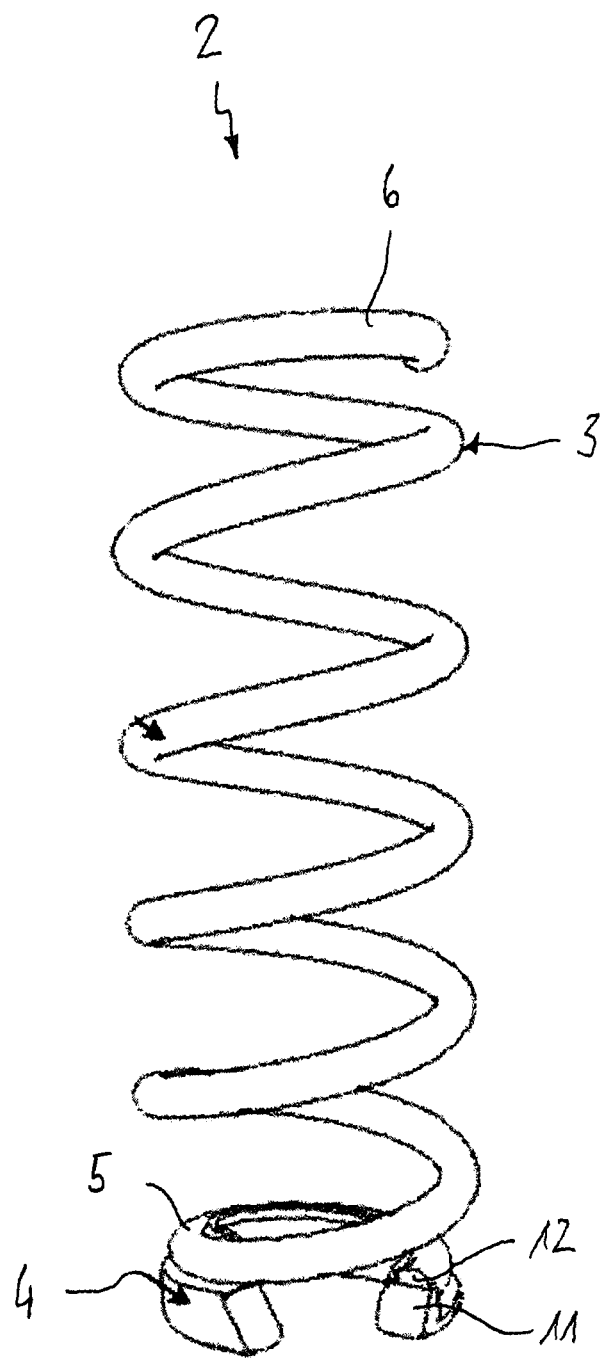
FIG. 1 is a perspective view of an exemplary spring support assembly having a spring and spring retainer.

FIGS. 1 to 5 will be described jointly below. They show an exemplary spring support assembly 2 comprising a spring 3 and spring retainer 4 to which an end portion 5 of the spring 3 is connected. The spring retainer 4 receives the end portion 5 of the spring 3 and can thus also be referred to as spring receiving means or spring receiving member. The spring 3 is made of a suitable spring material, more particularly of a hardened spring steel, wherein however, other types of spring material such as fibre-reinforced plastic material can also be used. The spring retainer 4 consist of a resilient material, more particularly of elastomer-containing plastics or rubber.

The spring 3 is formed as a helical spring which comprises a spring wire wound around a spring centre line. At its end opposed to the first end portion 5, the helical spring 3 comprises a second end portion 6 which can be received in a second spring retainer, i.e., a spring receiving element (not illustrated). The illustrated spring assembly 2 can be used in particular in a chassis of a motor vehicle, wherein in this case the spring assembly in cooperation with a shock absorber, absorbs respectively dampens vertical movements.

The spring 3 is provided with a coating 7 to protect the spring from rock fall and corrosion. The coating 7 can be applied to the spring by way of powder coating. For this, a single coating can be used in one example, with the spring first being zinc-phosphated and then powder-coated. If particularly stringent requirements have to be met, it is also possible to apply a double coating in which case a thin base coat is applied to a zinc-phosphated coating and then a thicker energy-absorbing top-coat layer is applied to the base coat. It is to be understood that other coatings including other suitable coating materials may also be used.

The coated spring 3 (coating 7) is adhesively bonded to the spring retainer 4 by an adhesive layer 8. The adhesive layer 8 comprises a lower hardness than the coating 7. More particularly, it is proposed that the spring coating comprises a hardness of at least 70 Shore-D. Accordingly, the hardness of the adhesive layer 8 amounts to a maximum of 70 Shore-D. To ensure that the adhesive layer 8 comprises a sufficiently great strength and does not form any undesirable weak spots in the assembly, the lower limit for the hardness of the adhesive layer 8 should preferably not be below a value of 40 Shore-D. The material for the adhesive layer 8 can be a chemically hardening adhesive based on an acryl derivate, more particularly based on methyl methacrylate.

Furthermore it is proposed that the adhesive layer 8 comprises a greater hardness than the spring retainer 4, wherein for the latter an upper limit of preferably 80 Shore-A should be met. To ensure a sufficiently high strength of the spring retainer it is advantageous to ensure a hardness of the spring retainer material of at least 50 Shore-A.

Overall it is achieved in this example that the hardness of the materials used decreases gradually from the spring 3 via the spring coating 7, the adhesive layer 8 and down to the resilient receiving member 4. In this way, the energy introduced into the spring 3 can be accommodated stepwise, with the resilient adhesive layer 8—through elastic deformation—being able to absorb part of the energy. Alternatively or in addition, it is proposed that the stiffness decreases from the spring 3 via the spring coating 7, further via the adhesive layer 8 and as far as the spring retainer 4.

Vice versa, the resilience of the materials used can increase, from the spring 3, via the spring coating 7, via the adhesive layer 8 to the spring retainer 4. Alternatively or in addition, it is possible that the elongation at failure increases from the spring 3, via the spring coating 7, via the adhesive layer 8 to the spring retainer 4. Elongation at failure is a measure for the deformability, respectively the ductility of a material. More particularly, the material of the adhesive layer is such that, in the hardened condition, it comprises an elongation at failure of at least 5%, more particularly of at least 50%, preferably at least 100%.

Figure 2:
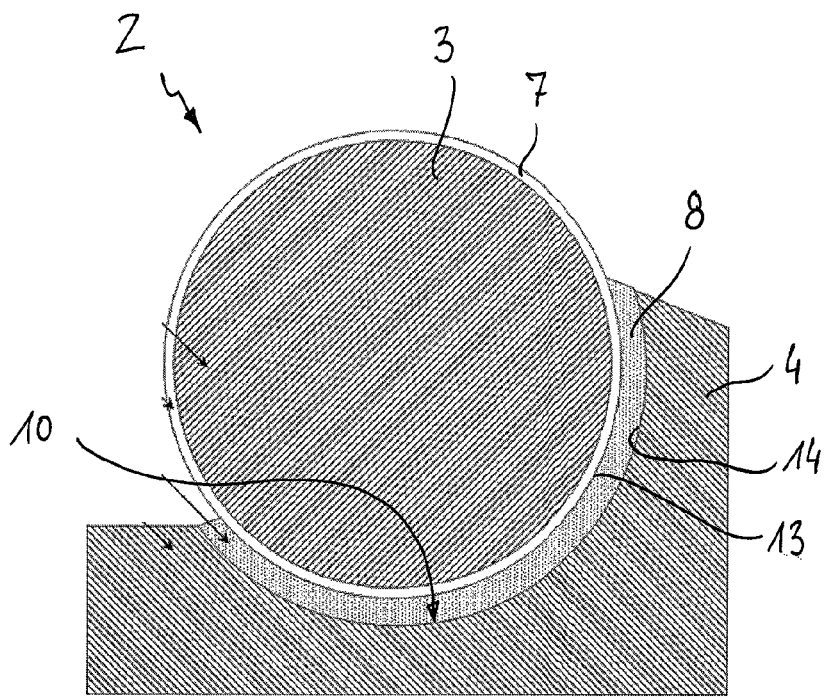
FIG. 2 is a radial section through the spring support assembly according to FIG. 1 through a sectional plane between adjoining spacers of the spring retainer.
Figure 3:
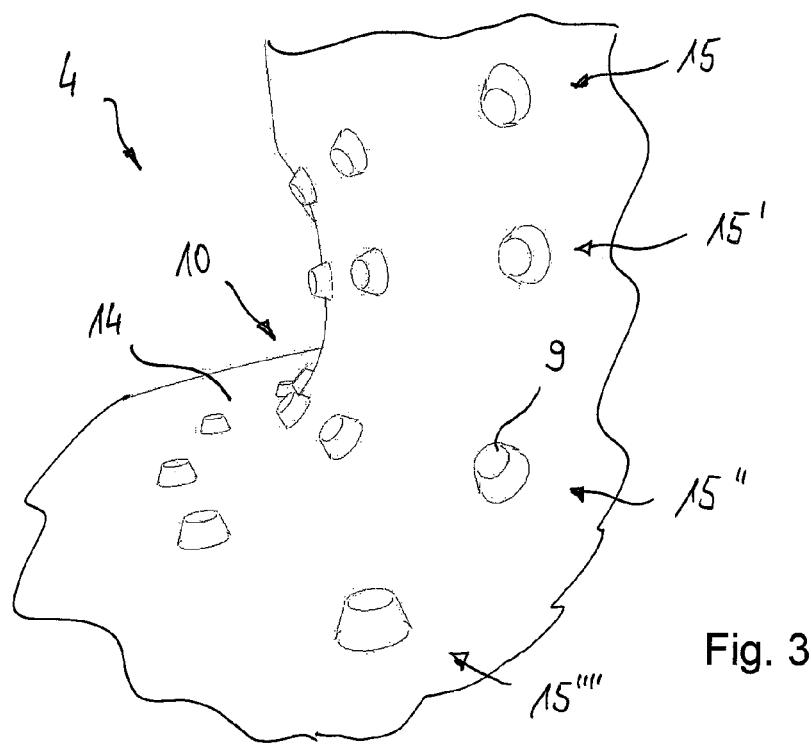
FIG. 3 shows a detail of the spring retainer of the spring assembly according to FIG. 1 in a three-dimensional illustration.
Figure 4:
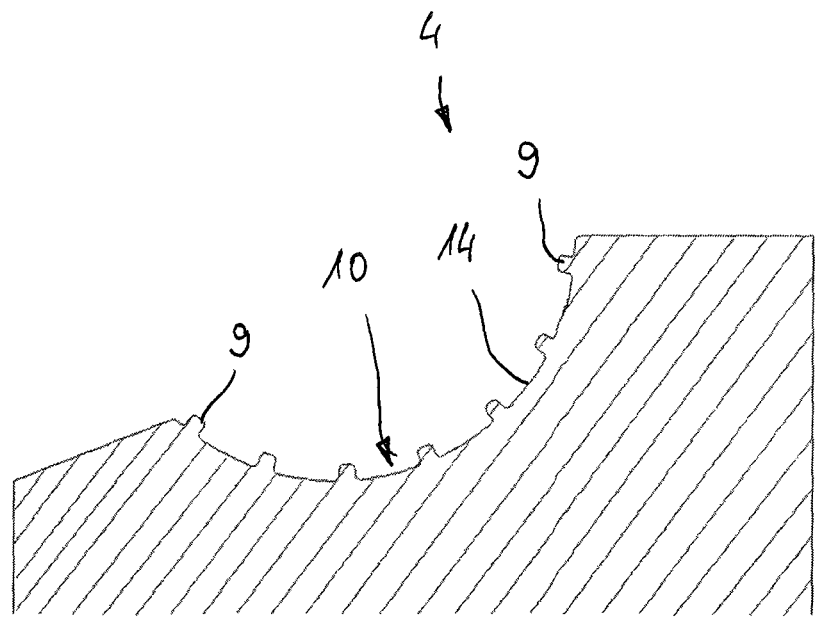
FIG. 4 is a radial section through the spring retainer of FIG. 1 through a sectional plane with spacers.

As can be seen in particular in FIG. 2, the adhesive layer 8 has a greater thickness than the coating 7. The thickness of the adhesive layer can range between 0.5 mm and 0.7 mm for example, wherein it is to be understood that smaller or greater adhesive layer thicknesses can also be used. More particularly, if a double coating (dual coat) is used for the spring, the thickness of the spring coating 7—which can amount to 0.5 mm or more—can be greater than the adhesive layer 8.

The spring retainer 4 is annular in shape or shaped in annular segments, and comprises a longitudinal axis. In the mounted condition of the assembly, the longitudinal axis of the spring retainer 4 is arranged at least close to the spring axis. The spring retainer 4 comprise a trough 10 which extends circumferentially around the longitudinal axis of the spring retainer 4 and in which the wound end portion 6 of the spring 3 is accommodated. The shape of the trough 10, more particularly also the axial gradient of the trough along the circumferential direction, is adapted to the shape of the spring 3, respectively to the gradient of the end winding of the spring. At the end of the trough 10 there is formed a stop 11 which supports the end 12 of the spring 3 in the circumferential direction.

In order to ensure the most uniform coating thickness of the adhesive layer 8 in the entire bonding area between the coated spring 3 and the spring retainer 4, the spring retainer comprises a multitude of spacers 9. The spacers 9 can also be referred to as distance pieces. The spacers 9 are distributed in such a way that the spring 3 is axially and radially aligned relative to the spring retainer 4, with the phrase "axially and "radially referring to the spring axis, i.e., to the axis of the spring retainer. For this purpose—as can be seen particularly in FIG. 3—a plurality of spacers is provided along the circumferential extension and along the radial extension of the trough 10 in which the end portion 6 of the spring 3 is received.

The spacers 9 are configured to hold a surface 13 of the coating 5 and a surface 14 of the spring retainer at a distance from one another, wherein the gap between the surface 13 of the coating and the surface 14 of the spring retainer 4 is filled with an adhesive layer 8. In this way, the spring 3 and the spring retainer 4 are firmly bonded to one another and form a structured unit. As can be seen in particular in FIG. 3, the spacers 9 are provided in the form of knobs, e.g., burls, which are produced so as to be integral with the spring receiving body 4 and which project from the trough surface 14. The spacers 9 are circumferentially distributed in several rows 15, 15', 15'', etc. It can be seen in FIG. 4 that in a radial section through the receiving member 4 there are provided several rows 15 of spacers 9. It is to be understood that also a number of knob rows can be used that differs from said seven rows of knobs or that the spacers 9 can also be unevenly distributed on the trough surface 14. In any case it is advantageous if the spacers are distributed in such a way that the spring 3 is aligned in the radial and axial direction relative to the spring retainer 4.

The height of the individual spacers 9 at least approximately defines the width of the gap formed between the trough surface 14 and the spring surface 13 and thus also the thickness of the adhesive layer 8. Thus, the spacers have a height of preferably 0.5 to 0.7 mm, with other sizes also being possible. To ensure that the spacers can easily be removed from their mould they are preferably designed such that they are tapered from the trough surface 14 towards their ends. In the present example, the spacers 9 are formed substantially truncated cone shaped, with a spherical shape also being possible. The spacers 9 are produced from the elastic material of the receiving member 4, so that the spring receiving member can be used for various springs 3 with different wire diameters.

Figure 5:
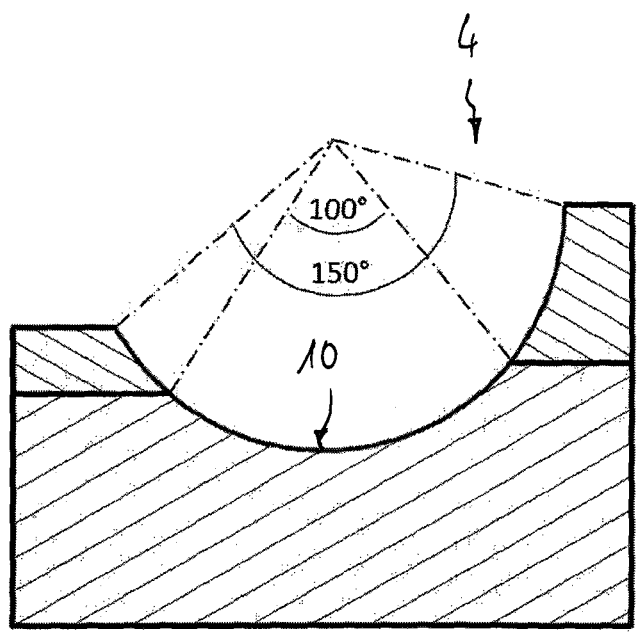
FIG. 5 shows a schematically radial section through the spring retainer for an exemplary spring support assembly.

As can be seen in particular in FIG. 5, the spring retainer can be designed such that the spring 3—in a radial section through the spring retainer 4, i.e., with respect to a cross-sectional view through the spring wire—is received over an angle of wrap of at least 30°, preferably at least 100° and/or a maximum of 150° in the spring retainer 4. As a result, the loads acting between the spring 3 and the spring retainer 4 are distributed as uniformly as possible, and it is ensured that the spring forces are well supported.

A process of producing the exemplary spring assembly 2 can comprise the following process steps: providing a spring retainer 4 made of an elastomer-comprising plastic material; providing an adhesive, with the adhesive being harder than the material of the spring retainer 4; providing a spring 3 with a coating 7, with the coating being harder than the adhesive; applying the adhesive to the spring retainer 4; and positioning the spring 3 on the spring retainer 4, that has been provided with adhesive, such that the surface 13 of the coating 7 and the surface 14 of the spring retainer 4 are held at a distance from one another.

After the adhesive has been applied to the spring retainer 4, the spring 3 is placed on to the spring retainer 4 and, for the duration of hardening of the adhesive, the spring 3 is fixed, i.e., held relative to the spring retainer 4. The hardening of the adhesive takes place, more particularly, at room temperature. The hardened adhesive then forms the adhesive layer 8 which firmly connects the spring 3 to the spring receiving member. The adhesive connection (bond) is more particularly such that it can no longer be released in a non-destructive way.

An advantage of the spring assembly 2 is that the adhesive layer 8 can be elastically deformed and is able to absorb part of the energy introduced into the system by elastic deformation. Thus, stresses in the interface region of the interconnected material, respectively components, are lower, so that any load-related wear occurring when the spring assembly is in operation, is also low.

The invention claimed is:

1. A spring assembly, comprising:
    a spring having a coating;
    a spring retainer made of a plastic material; and
    an adhesive layer by which the spring and the spring retainer are adhesively connected to one another;
    wherein a hardness of the adhesive layer is lower than a hardness of the coating of the spring.

2. A spring assembly according to claim 1,
    wherein spacers are provided by which a surface of the coating and a surface of the spring retainer are spaced from one another;
    wherein a space formed between the surface of the coating and the surface of the spring retainer is at least largely filled with the adhesive layer.

3. A spring assembly according to claim 2, wherein the spacers are spaced and distributed such that the spring and the spring retainer are at least one of axially and radially aligned relative to one another with reference to the spring axis.

4. A spring assembly according to claim 2, wherein the spacers are provided in the form of projections which project from the surface of the spring retainer.

5. A spring assembly according to claim 2, wherein a plurality of spacers are arranged so as to be offset relative to one another at least one of in the circumferential direction along a winding portion of the spring and along a part of a spring wire circumference.

6. A spring assembly according to claim 1, wherein the hardness of the adhesive layer is greater than a hardness of the spring retainer.

7. A spring assembly according to claim 1, wherein the hardness of the adhesive layer is at least one of a minimum of 40 Shore-D and a maximum of 70 Shore-D.

8. A spring assembly according to claim 1, wherein the adhesive layer comprises an elongation at failure of at least 5%.

9. A spring assembly according to claim 1, wherein the hardness of the coating is at least 70 Shore-D.

10. A spring assembly according to claim 1, wherein the hardness of the spring retainer is at least one of a minimum of 50 Shore-A and a maximum of 80 Shore-A.

11. A spring assembly according to claim 1, wherein the adhesive layer has a thickness of at least 0.1 millimeters and at most 3.0 millimeters.

12. A spring assembly according to claim 1,
wherein the spring retainer is such that the spring, if viewed in the cross-section through the spring, is received in the spring retainer over a wrap angle range of at least 30°, and is connected to the spring retainer via the adhesive layer,
wherein the adhesive layer has a substantially constant thickness in the wrap angle range.

13. A process of producing a spring assembly having a spring and a spring retainer, comprising:
providing a spring retainer made of plastic material with a first hardness;
providing an adhesive with a second hardness which is greater than the first hardness of the spring retainer;
providing a spring with a coating with a third hardness which is greater than the second hardness of the adhesive;
applying the adhesive to the spring retainer; and
positioning the spring on the spring retainer provided with the adhesive such that a surface of the coating and a surface of the spring retainer are held so as to be spaced from one another.

14. A process according to claim 13,
wherein for the spring retainer a plastic material is used with a first hardness of at least 50 Shore-A and at most 80 Shore-A,
wherein an adhesive is used with a second hardness of at least 40 Shore-D and at most 70 Shore-D, and
wherein a coating is used with a third hardness with at least 70 Shore-D.

15. A process according to claim 13, wherein applying the adhesive is carried out substantially pressure-free.

16. A process according to claim 13, wherein applying the adhesive takes place at room temperature.

* * * * *